L. GOLLY.
BALL BEARING.
APPLICATION FILED MAY 16, 1911.
1,121,087.
Patented Dec. 15, 1914.
2 SHEETS—SHEET 1.
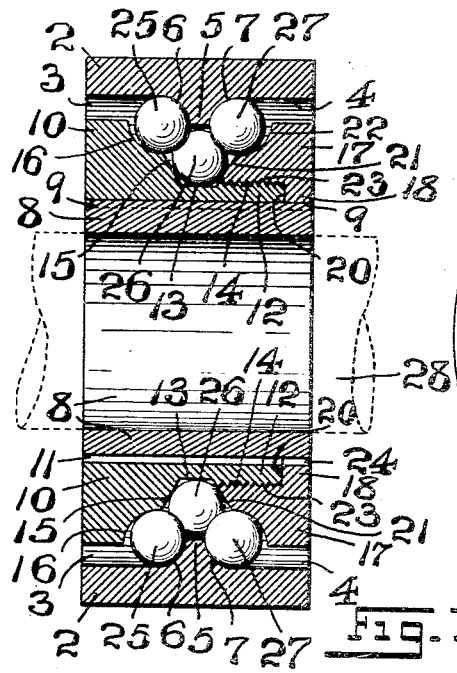
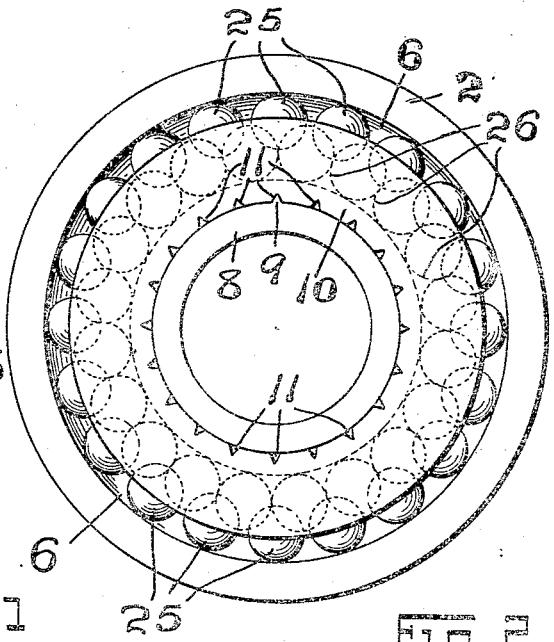
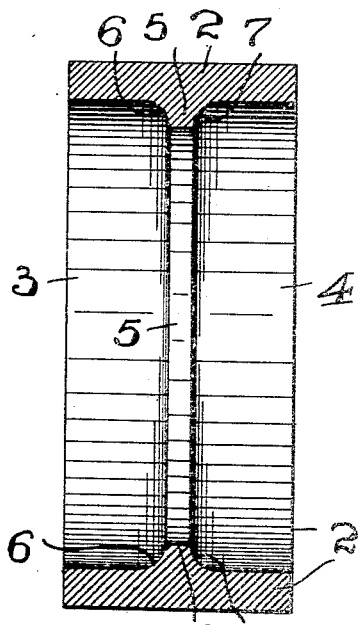
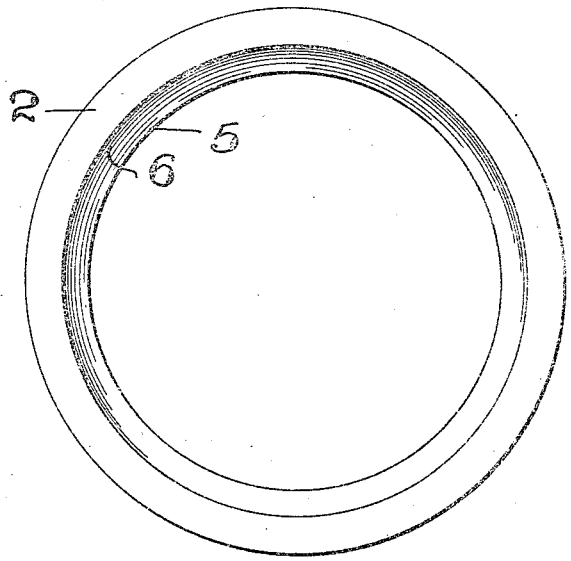
WITNESSES:
Fred'k H. W. Fraentzel
Harry E. Pfister
INVENTOR:
Louis Golly,
BY Fraentzel and Richards,
ATTORNEYS.

L. GOLLY.
BALL BEARING.
APPLICATION FILED MAY 16, 1911.

1,121,087.

Patented Dec. 15, 1914.
2 SHEETS—SHEET 2.

WITNESSES:
Fredk H. W. Fraentzel
Harry E. Pfeiffer

INVENTOR:
Louis Golly,
BY Fraentzel and Richards
ATTORNEYS

UNITED STATES PATENT OFFICE.

LOUIS GOLLY, OF BROOKLYN, NEW YORK.

BALL-BEARING.

1,121,087.   Specification of Letters Patent.   Patented Dec. 15, 1914.

Application filed May 16, 1911. Serial No. 627,487.

*To all whom it may concern:*

Be it known that I, LOUIS GOLLY, a citizen of the United States, residing at Brooklyn, in the county of Kings and State of New York, have invented certain new and useful Improvements in Ball-Bearings; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to anti-friction bearings; and, this invention relates, more particularly, to a novel ball-bearing, with a view of providing a bearing of this character in which there is a greater rolling surface, with a corresponding decrease of friction between the movable parts of the bearing.

The invention, therefore, has for its principal object to provide a simply constructed and efficiently operating ball-bearing, the parts thereof being reduced to a minimum and the balls being increased in number to a maximum, all being arranged in a small and compact space and the various parts of the bearing being readily separable.

Other objects of this invention not at this time more particularly enumerated will be clearly understood from the following detailed description of the present invention.

With the various objects of the present invention in view, the said invention consists, primarily, in the novel ball-bearing hereinafter set forth; and, the invention consists, furthermore, in the arrangements and combinations of the various devices and parts, as well as in the details of the construction of the same, all of which will be more particularly described in the following specification, and the embodied in the clauses of the claims which are appended to and which form an essential part of this specification.

The invention is clearly illustrated in the accompanying drawings, in which:—

Figure 5:
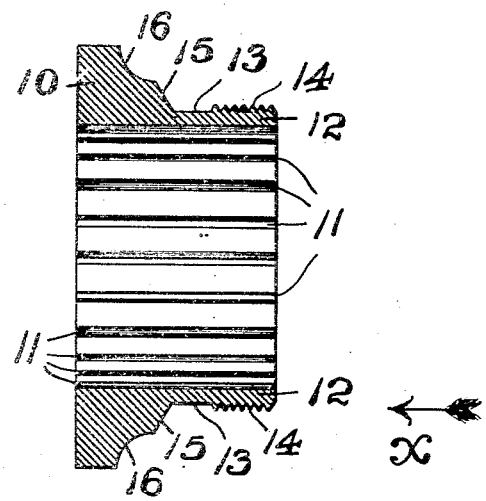
Figure 7:
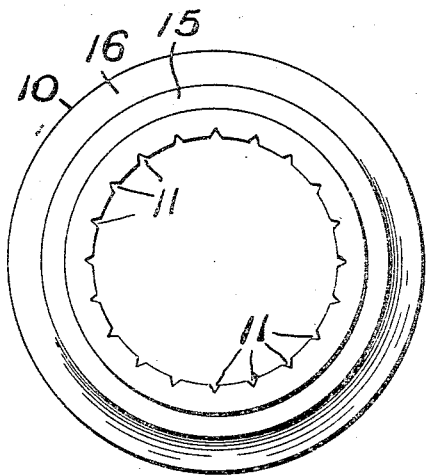
Figure 9:
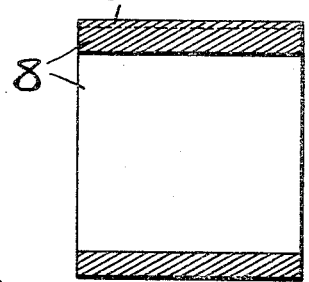
Figure 8:
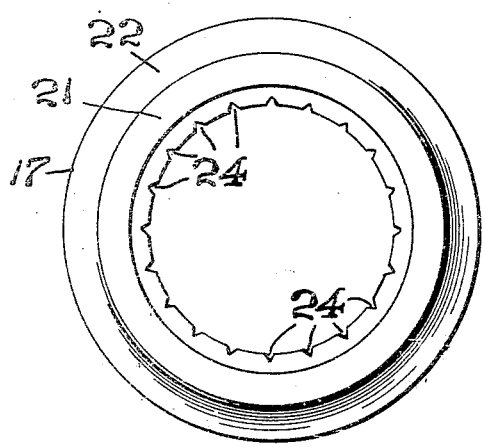
Figure 6:
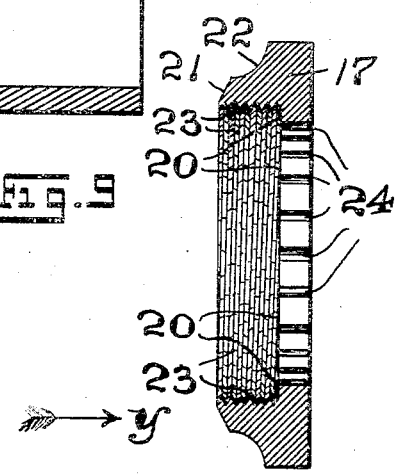

Figure 1 is a transverse vertical section of one form of ball-bearing made according to and embodying the principles of the present invention; and Fig. 2 is a face view of the said ball-bearing. Fig. 3 is a transverse vertical section of the outer ball-retaining member or element of the ball-bearing; and Fig. 4 is a face view of the same. Figs. 5 and 6 are transverse vertical sections of a pair of separable ball-race members or elements employed with the said outer ball-retaining member or element for retaining the balls in rolling contact; Fig. 7 is a face view of the said ball-race member or element illustrated in said Fig. 5, looking in the direction of the arrow $x$; and Fig. 8 is a similar view of the ball-race member or element illustrated in said Fig. 6, looking in the direction of the arrow $y$, all of said views being made on a slightly reduced scale. Fig. 9 is a transverse vertical section of a lock-ring or element employed with relation to the said ball-race members or elements; and Fig. 10 is a face view of the same, said Figs. 9 and 10 being also made on a slightly reduced scale.

Similar characters of reference are employed in all of the above described views, to indicate corresponding parts.

Referring now to the several figures of the drawings, Figs. 1 and 2 indicate a complete ball-bearing made according to and embodying the principles of the present invention, the same comprising an outer ball-retaining member or element 2, which is made, preferably, in the form of a cylindrical shell or casing, usually open at both ends, substantially as shown. The inner cylindrically formed wall-portions 3 and 4 of the said ball-retaining member or element 2 are separated by an inwardly projecting annular rib or projection, as 5, formed upon its opposite sides or faces with annular concave race-portions 6 and 7.

Figure 10:
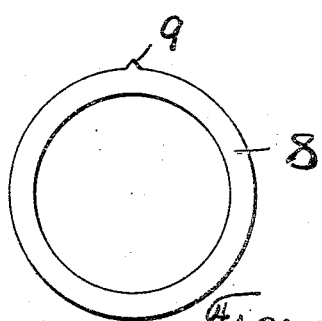

The reference-character 8 indicates a locking or member of a tubular configuration, shown more particularly in Figs. 9 and 10 of the drawings. The said lock-ring or member 8 being made substantially in the form of a cylinder, and having extending outwardly from the said outer cylindrical surface, a longitudinally extending rib or projection, as 9, which is preferably made V-shaped, as shown. Suitably arranged upon the outer cylindrical surface of the said lock-ring or member 8 is an annular and tubularly formed ball race-member 10, which is formed upon its inner tubular surface with a series of longitudinally extending depressions or grooves, as 11, for the purposes to be hereinafter more fully specified, the said ball-race member being of less width than the width of the ball-retaining member or element 2, as represented in Fig. 1 of the drawings, and the said ball-race member 10 having a reduced tubular part, as 12, which is formed upon its outer cylindrical surface with a straight cylindrical rolling surface 13 and an exteriorly screw-threaded part 14. The said ball-race member 10 is also made with an angularly extending annular surface-portion 15, and a concave rolling portion 16, substantially as illustrated in said Fig. 1 of the drawings. The reference-character 17 indicates another ball-race member or element which is made with a tubular part 18, forming with a portion 19 of the said ball-race member or element 17, an annular offset or shoulder 20. The said portion 19 is made with an angular rolling surface, as 21, and a concave rolling surface, as 22, substantially as illustrated in said Fig. 1, the said portion 19 being made also with an internally screw-threaded part 23. The said tubular part 19 is also provided upon its inner tubular surface with a series of longitudinally extending depressions or grooves, as 24, which correspond in number to the previously mentioned depressions or grooves 11, and the said depressions or grooves 24 being adapted to be brought in alinement with the said depressions or grooves 24 when the screw-threaded portion of the ball-race member or element 17 is screwed upon the screw-threaded portion of the ball-race member or element 10, in the manner illustrated in said Fig. 1 of the drawings, with the off-set or shoulder 20 of the ball-race member resting against the end-portion of the tubular part 12 of the ball-race member or element 11, as shown. When these parts or devices are thus secured in their assembled relations, three annular ball-races or chambers will be provided in which are respectively disposed three series of anti-friction balls 25, 26 and 27, the outer series of balls 25 and 27 being also in rolling contact with the intermediate series of balls 26, substantially in the manner represented and clearly illustrated in Figs. 1 and 2 of the drawings. As shown, the longitudinally extending grooves or depressions 11 and 24 in the respective ball-race members or elements 10 and 17 are also preferably made V-shaped, so as to correspond to the V-shaped rib or projection 9 of the lock-ring or member 8.

When the several parts 2, 10 and 17, with the several series of balls 25, 26 and 27, have been brought into their assembled relation, so as to provide the ball-bearing proper, and the lock-ring or member 8 has been suitably mounted and secured upon a shaft or spindle, as 29, the assembled parts 2, 10 and 27 are slipped upon the said lock-ring or member 8, with the rib or projection 9 of said lock-ring or member being arranged within and being caused to register with one set of said alined grooves or depressions 12 and 24, whereby the parts of the completed ball-bearing are operatively mounted with relation to the said spindle or shaft 28 and the said lock-ring or member 8, as will be clearly understood from an inspection of said Fig. 1 of the drawings.

From the foregoing description of my present invention, it will be clearly evident that I have devised a simply constructed and efficiently operating ball-bearing in which the rolling parts operate with greater freedom and with less friction, the parts being subject to less wear than with the constructions of ball-bearings where but a single series of balls are employed. Other advantages of the present invention are clearly evident from the foregoing description of this invention, and from an inspection of the several figures of the drawings, the principal feature being that the ball-bearing proper can be readily removed from its operative relation with the spindle or shaft, without disturbing the assembled relations of the ball-retaining ring or shell, the two ball-race members or elements, and the three series of balls, so that in removing the spindle or shaft by simply slipping the lock-ring or element 8 from its connected relation with the two ball-race members or elements 10 and 17, the several balls will not fall out of position and thus become lost and cause the usual annoyance.

I am aware that changes may be made in the general arrangements and combinations of the various devices and parts, as well as in the details of the construction of the same, without departing from the scope of the present invention as set forth in the foregoing specification and as defined in the claims which are appended thereto. Hence, I do not limit my present invention to the exact arrangements and combinations of the several devices and parts as described in the said specification, nor do I confine myself to the exact details of the construction of the said parts, as illustrated in the accompanying drawings.

I claim:—

1. A ball-bearing including an outer ball-retaining member, and connected inner ball-race elements, said outer ball-retaining member forming with said inner ball-race elements a multiplicity of ball-races, said ball-race elements being provided with a series of longitudinally extending depressions, combined with an inner locking member for mounting said bearing upon a shaft or spindle, said inner locking member being removable from within the connected outer ball-retaining member and the inner ball-race elements without disturbing the arrangement of the balls, and a longitudinally extending rib connected with said locking member adapted to be brought into registration with the depressions of said ball-race elements.

2. A ball-bearing including an outer ball-retaining member, inner ball-race elements formed with screw-threaded portions whereby said ball-race elements are adapted to be separably connected, said outer ball-retaining member forming with said inner ball-race elements a multiplicity of ball-races, said ball-race elements being provided with a series of longitudinally extending depressions, combined with an inner locking member for mounting said bearing upon a shaft or spindle, and a longitudinally extending rib connected with said locking member adapted to be brought into registration with the depressions of said ball-race elements.

3. A ball-bearing including a tubular outer ball-retaining member, said ball-retaining member being provided upon its inner surface with an inwardly extending annular projection formed with concave surface-portions, and connected inner ball-race elements, one of said ball-race elements being formed with a flat annular rolling surface, and both of said ball-race elements being formed with angular and concave rolling surfaces, the rolling surfaces of said ball-race elements forming with the concave surface-portions of said ball-retaining member a multiplicity of ball-races, and a series of rolling balls in each ball-race, combined with an inner locking member for mounting said bearing upon a shaft or spindle, said inner locking member being removable from within the connected outer ball-retaining member and the inner ball-race elements without disturbing the arrangement of the balls.

4. A ball-bearing including a tubular outer ball-retaining member, said ball-retaining member being provided upon its inner surface with an inwardly extending annular projection formed with concave surface-portions, and connected inner ball-race elements, one of said ball-race elements being formed with a flat annular rolling surface, and both of said ball-race elements being formed with angular and concave rolling surfaces, the rolling surfaces of said ball-race elements forming with the concave surface-portions of said ball-retaining member a multiplicity of ball-races, said ball-race elements being provided with a series of longitudinally extending depressions, combined with an inner locking member for mounting said bearing upon a shaft or spindle, said inner locking member being removable from within the connected outer ball-retaining member and the inner ball-race elements without disturbing the arrangement of the balls, and a longitudinally extending rib connected with said locking member adapted to be brought into registration with the depressions of said ball-race elements.

5. A ball-bearing including a tubular ball-retaining member, said ball-retaining member being provided upon its inner surface with an inwardly extending annular projection formed with concave surface-portions, inner ball-race elements formed with screw-threaded portions whereby said ball-race elements are adapted to be separably connected, one of said ball-race elements being formed with a flat annular rolling surface, and both of said ball-race elements being formed with angular and concave rolling surfaces, the rolling surfaces of said ball-race elements forming with the concave surface-portions of said ball-retaining member a multiplicity of ball-races, and a series of rolling balls in each ball-race, combined with an inner locking member for mounting said bearing upon a shaft or spindle, said inner locking member being removable from within the connected outer ball-retaining member and the inner ball-race elements without disturbing the arrangement of the balls.

6. A ball-bearing including a tubular ball-retaining member, said ball-retaining member being provided upon its inner surface with an inwardly extending annular projection formed with concave surface-portions, inner ball-race elements formed with screw-threaded portions whereby said ball-race elements are adapted to be separably connected, one of said ball-race elements being formed with a flat annular rolling surface, and both of said ball-race elements being formed with angular and concave rolling surfaces, the rolling surfaces of said ball-race elements forming with the concave surface-portions of said ball-retaining member a multiplicity of ball-races, said ball-race elements being provided with a series of longitudinally extending depressions, combined with an inner locking member for mounting said bearing upon a shaft or spindle, said inner locking member being removable from within the connected outer ball-retaining member and the inner ball-race elements without disturbing the arrangement of the balls, and a longitudinally extending rib connected with said locking member adapted to be brought into registration with the depressions of said ball-race elements.

7. A ball-bearing including a tubular ball-retaining member, said ball-retaining member being provided upon its inner surface with an inwardly extending annular projection formed with concave surface-portions, inner ball-race elements formed with screw-threaded portions whereby said ball-race elements are adapted to be separably connected, one of said ball-race elements being formed with a flat annular rolling surface, and both of said ball-race elements being formed with angular and concave rolling surfaces, the rolling surfaces of said ball-race elements forming with the concave surface-portions of said ball-retaining member a multiplicity of ball-races, and a multi-series of rolling balls in said ball-races, each ball in an intermediately disposed series of balls contacting with the balls of the two series of balls adjacent to said mentioned intermediate series of balls, combined with an inner locking member for mounting said bearing upon a shaft or spindle, said inner locking member being removable from within the connected outer ball-retaining member and the inner ball-race elements without disturbing the arrangement of the balls.

8. A ball-bearing including a tubular ball-retaining member, said ball-retaining member being provided upon its inner surface with an inwardly extending annular projection formed with concave surface-portions, inner ball-race elements formed with screw-threaded portions whereby said ball-race elements are adapted to be separably connected, one of said ball-race elements being formed with a flat annular rolling surface, and both of said ball-race elements being formed with angular and concave rolling surfaces, the rolling surfaces of said ball-race elements forming with the concave surface-portions of said ball-retaining member a multiplicity of ball-races, and a multi-series of rolling balls in said ball-races, each ball in an intermediately disposed series of balls contacting with the balls of the two series of balls adjacent to said mentioned intermediate series of balls, said ball-race elements being provided with a series of longitudinally extending depressions, combined with an inner locking member for mounting said bearing upon a shaft or spindle, said inner locking member being removable from within the connected outer ball-retaining member and the inner ball-race elements without disturbing the arrangement of the balls, and a longitudinally extending rib connected with said locking member adapted to be brought into registration with the depressions of said ball-race elements.

In testimony, that I claim the invention set forth above I have hereunto set my hand this 13th day of May, 1911.

LOUIS GOLLY.

Witnesses:
 ALEXANDER GOLLY,
 FREDK. C. FRAENTZEL.